United States Patent [19]
Dwyer

[11] Patent Number: 6,139,412
[45] Date of Patent: *Oct. 31, 2000

[54] FIXTURE FOR MANUFACTURING PRECISELY SHAPED PARTS

[75] Inventor: James P. Dwyer, Gilford, Conn.

[73] Assignee: United Technologies Corporation, Hartford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/640,045

[22] Filed: Apr. 30, 1996

[51] Int. Cl.[7] .................................................. B24B 41/06
[52] U.S. Cl. ........................ 451/365; 451/403; 451/339; 269/296
[58] Field of Search ................................. 451/365, 369, 451/403, 339; 29/156.8 B; 269/296

[56] References Cited

U.S. PATENT DOCUMENTS

| | | |
|---|---|---|
| 2,088,359 | 7/1937 | Albertson . |
| 3,145,512 | 8/1964 | Hirchert . |
| 4,016,683 | 4/1977 | Cretella ..................................... 51/143 |
| 4,128,929 | 12/1978 | DeMusis ................................. 451/365 |
| 4,589,175 | 5/1986 | Arrigoni ................................. 451/365 |
| 4,638,602 | 1/1987 | Cavalieri ................................. 451/365 |
| 4,805,351 | 2/1989 | Dobson et al. ......................... 451/365 |
| 4,829,720 | 5/1989 | Cavalieri ................................. 451/365 |
| 5,222,330 | 6/1993 | Krol . |
| 5,230,183 | 7/1993 | Wagner, Jr. ............................. 451/365 |
| 5,275,536 | 1/1994 | Stephens et al. ....................... 416/248 |
| 5,377,456 | 1/1995 | Dixon . |

FOREIGN PATENT DOCUMENTS

| | | |
|---|---|---|
| 0 436 933 A2 | 7/1991 | European Pat. Off. . |
| 1 025 881 | 4/1953 | France . |
| 2 238 607 | 2/1974 | Germany . |
| 2 047 897 | 12/1980 | United Kingdom . |

*Primary Examiner*—Eileen P. Morgan

[57] ABSTRACT

A fixture for manufacturing a precisely shaped part, such as a turbine blade, securely holds a blank for subsequent machining. A blank for use with the fixture generally comprises a tip, a root region longitudinally spaced from the tip, and a midspan region extending therebetween. The blank is further characterized by a sacrificial region extending substantially longitudinally from the root region, a stacking axis and a root centerline from which critical dimensions of the blade are referenced, and a plurality of locators. The first locator, a bore, being disposed at the tip on the stacking axis. The second locator, a notch, being disposed within the sacrificial region aligned with the stacking axis. The third locator, a notch, being disposed within the sacrificial region is characterized by a corner, which is parallel to the root centerline. The fixture includes a base having end walls being spaced apart to accommodate the blank therebetween. One end wall supports a clamping mechanism, and the other end wall supports an abutment means. The locators are shaped to mate with the clamping mechanism and the abutment means, respectively. Upon placing the blank between the end walls and actuating the clamping mechanism, the clamping mechanism mates with the first locator, and forces the second locator into contact with the abutment means. Once the blank is clamped into the fixture, details, such as dove tails in the root region, can be accurately machined into the blank forming a precisely shaped part.

19 Claims, 4 Drawing Sheets

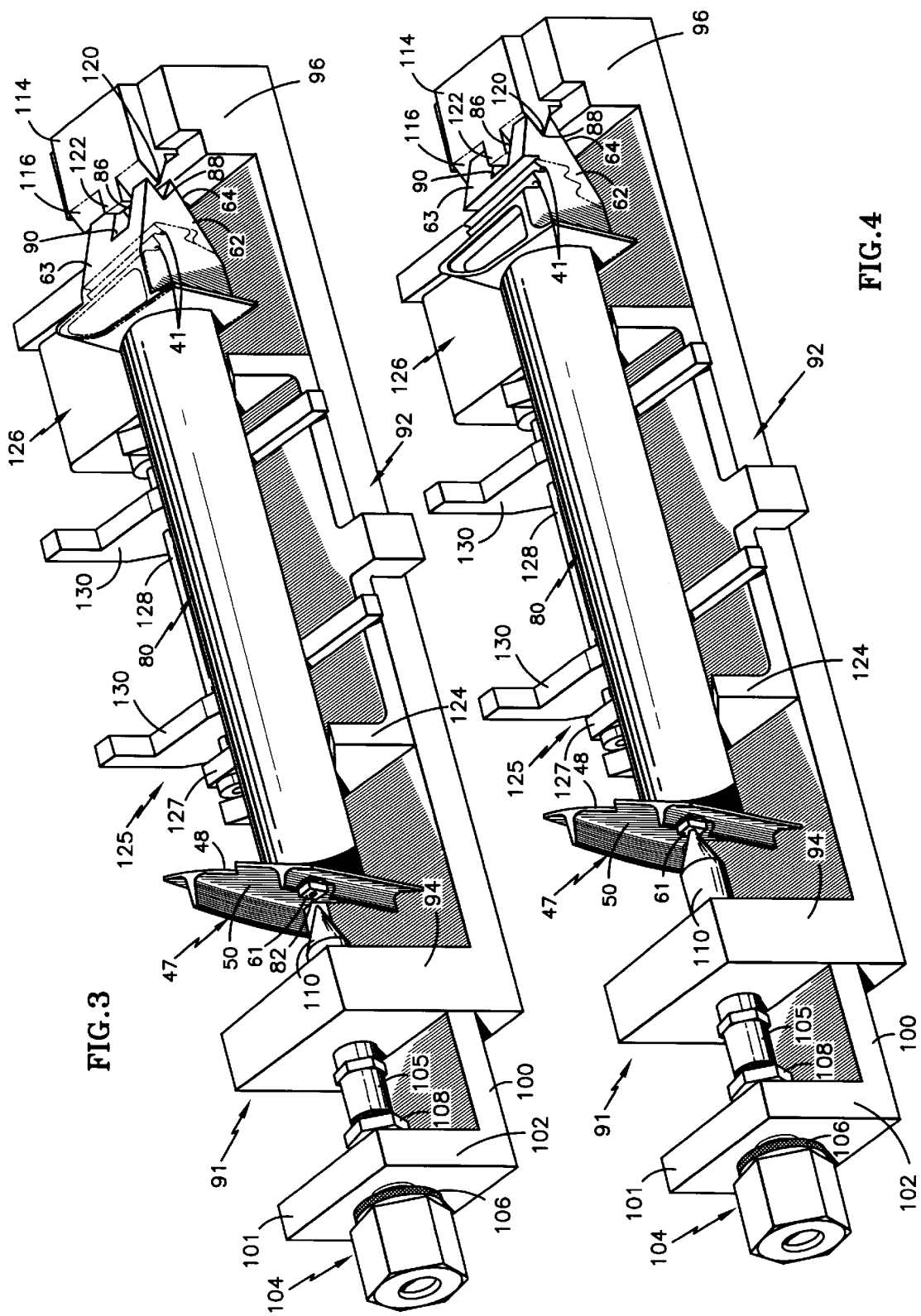

FIXTURE FOR MANUFACTURING PRECISELY SHAPED PARTS

TECHNICAL FIELD

The present invention relates to precisely shaped parts, and more particularly to a fixture for manufacturing precisely shaped parts.

BACKGROUND OF THE INVENTION

Many industries use precisely shaped parts. For example, conventional blades for use in gas turbine engines must be precisely shaped. Typically, precision investment casting or die-forging forms a metal starting blank into a blank having a blade shape.

Generally, the blank includes a tip, a root region longitudinally spaced therefrom, and a midspan region extending between the tip and the root region. A platform typically separates the root region from the midspan region. The tip may include an attached or integral shroud. A number of details must be machined into these portions of the blank, to put the precisely shaped part is in its final configuration. For example, a plurality of dove tails must be machined into the root region. These dove tails allow the blade to be secured to the rotor disk in the engine. In order to achieve acceptable engine performance, these dove tails must be formed within small tolerances. To machine the dove tails into the blank with the necessary accuracy, there must be references from which to measure the configuration of the dove tails, and a fixture for holding the blank during machining. The references used dictate the type of fixture that will be used.

There are a variety of ways to provide such references and fixturing. The references may be provided as taught in U.S. Pat. No. 2,577,747 issued to Gibian. Gibian teaches forging at least two hemispherical buttons or protrusions into the blank. Both buttons are disposed on the blank along the stacking axis. Using these buttons, the root region can be ground down to a predetermined thickness, and a bore can be drilled into the opposite end of the blank. Using a lathe as the fixture, the blank is held by clamping the root region and using a pin to engage the bore, allowing machining of the leading and trailing edges of the blank.

The most significant problem with the solution taught in Gibian, is that machining the bore and the thickness of the root region based upon the buttons will not produce sufficiently accurate results. Another problem is that although the lathe positions the blade securely along the stacking axis by using the thickness of the root region and the bore as references, the root region of the blade cannot be machined while being held in the lathe.

References and fixturing may also be provided as taught in U.S. Pat. No. 3,818,646 issued to Peterson. Peterson teaches a locating button on the root portion of the blade disposed along a design axis of the blade, such as the stacking axis. A fixture utilizes this button as a reference. While in the fixture, datum planes may be ground or machined into the root and shroud portions of the blade to define accurately located surfaces for subsequent machining.

One problem with this solution is that the fixture clamps the blank along the airfoil-shaped midspan by clamping mechanisms. As a result, the fixtures are complex and therefore expensive to design, manufacture, and maintain. Furthermore, clamping along the midspan makes the fixture dependent on the size and shape of the blade. Due to this dependency a number of fixtures are necessary to make all the blades in one engine, since an engine has several different size and shaped blades. Another problem with using a blade dependent fixture is that during production, time may be wasted changing between fixtures, thus significantly limiting the number of blades that can be manufactured in a period of time.

Another possible way of providing references is by encapsulating the blank in a block of material, such as a low melt alloy. The block of material is formed around the blank, so that the root region extends from the block. The sides of the block provide reference planes from which the configuration of the dove tails or other details can be determined with the necessary accuracy. Encapsulating the blank requires a complex encapsulation tool. This encapsulation tool is time consuming to design and build, is blade dependent, and is not robust. Consequently, the encapsulation tool is costly to manufacture and maintain, and a different tool is required for each differently shaped or sized blank. In addition, in this arrangement, a complex fixture is necessary to hold the block containing the blank during machining of the blank. This fixture is also expensive to design and maintain, and is blade length dependent. Furthermore, after machining the dove tails into the blank, the material must be melted off the blank. The material must be disposed of without causing environmental problems. In addition, any impurities remaining in the blade after encapsulation may cause the blade to crack during subsequent heat treatment or operation of the engine, so removal of the impurities is critical. This removal is accomplished by acid leeching and analyzing the blades. Acid leeching is expensive and environmentally hazardous, and this in combination with the analysis of the blades, further increases the cost of producing blades using encapsulation.

Therefore, an improved fixture is sought, which holds the blank securely during subsequent machining, thus forming a precisely shaped part. The fixture being inexpensive to design and maintain, and easily modifiable to accommodate different size or shape blades.

SUMMARY

According to the present invention, a fixture for manufacturing precisely shaped parts is disclosed. The fixture is for use with a blank. The blank generally, includes a tip at one end, a longitudinally spaced root region, a sacrificial region extending longitudinally from the root region, and a plane. The blank further includes a plurality of locators disposed within the plane. The first locator being disposed at the tip, and the second locator being disposed within the sacrificial region.

The fixture including a U-shaped base having end walls being spaced apart to accommodate the blank. One of the end wall supports a clamping mechanism. The other end wall supports an abutment means. According to one embodiment of the invention, the clamping mechanism includes a conical pin slidably engaged with the associated end wall of the base. Actuating the clamping mechanism moves the conical pin into contact with the first locator. The conical pin forces the second locator into contact with the abutment means. When the clamping mechanism is fully engaged, the blank is securely held within the fixture between the conical pin and the abutment means, and the blank is aligned along the plane. Since the plane is one from which critical dimensions are referenced, details, such as dove tails in the root region, can be accurately machined into the blank forming a precisely shaped part.

As a result of using locators that are integral with the blank and disposed upon the ends of the blank, the fixture for use during subsequent machining is simple to design and manufacture. This allows the machining process to be automated. Furthermore, the fixture can be easily modified to accommodate different size or shaped blades by making one of the end walls movable.

According to another embodiment of the invention, the base of the fixture includes a platform disposed thereon, and an ejector for lifting the blank from the platform. The platform allows proper loading of the blank into the fixture with minimum operator manipulation.

BRIEF DESCRIPTION OF THE DRAWING

FIG. 3 is a perspective view of an embodiment of a fixture of the present invention with the blank is resting on a platform within the fixture in the open position.

FIG. 4 is a perspective view of an embodiment of a fixture of the present invention with the blank is resting on a platform within the fixture in the closed position.

BEST MODE FOR CARRYING OUT THE INVENTION

Some of the subject matter herein may be disclosed and/or claimed in the following copending applications: "A Blank for Manufacturing Precisely Shaped Parts", U.S. Ser. No. 08/641,251; "A Method for Manufacturing Precisely Shaped Parts", U.S. Ser. No. 08/993,073; and "Turbomachinery Blade or Vane With a Permanent Machining Datum", U.S. Ser. No. 08/953,129.

Figure 1:
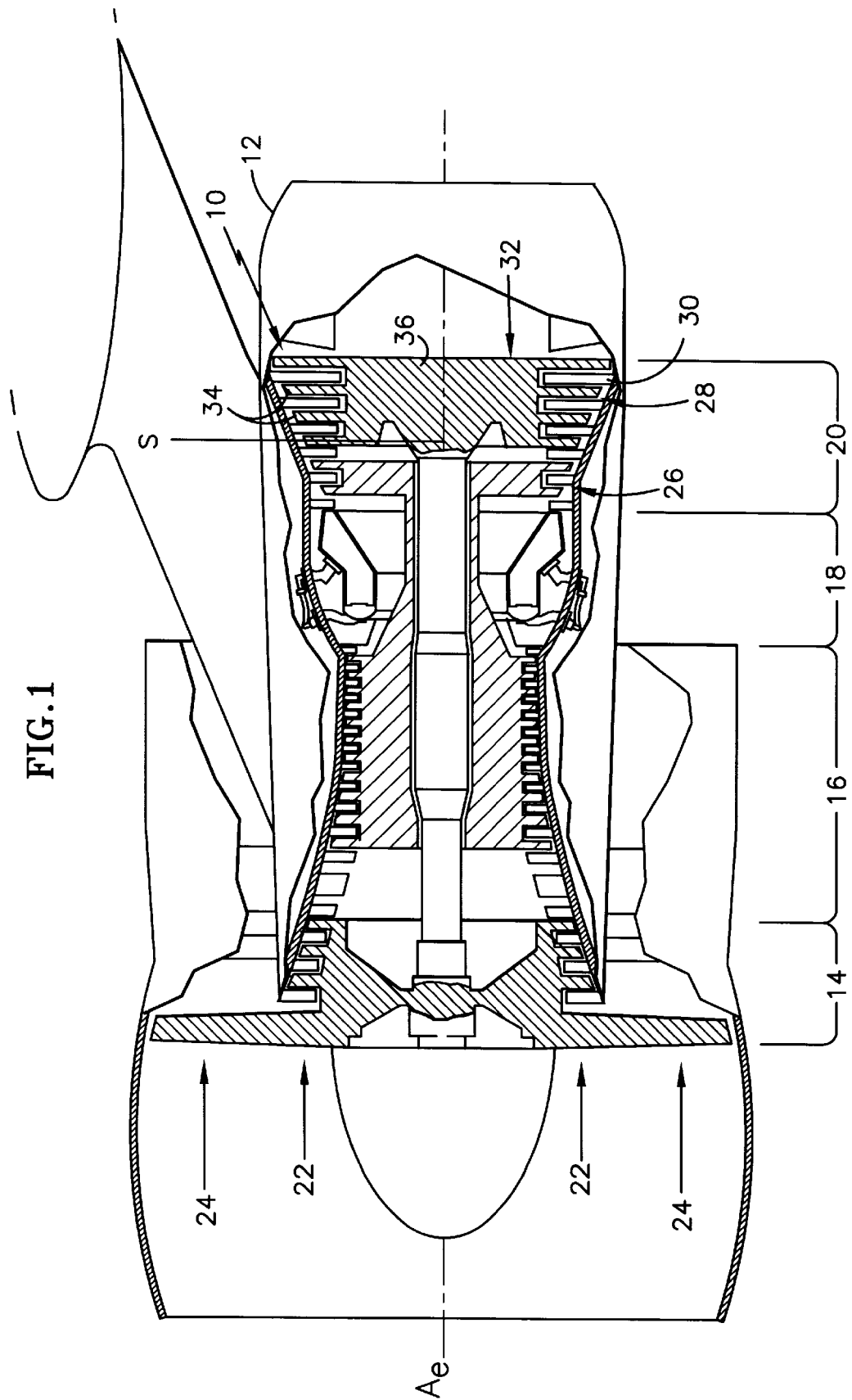
FIG. 1 is a side elevation schematic representation of an axial flow, turbofan gas turbine engine.

Referring to FIG. 1, an axial flow, turbofan gas turbine engine 10 is mounted in an aircraft nacelle 12. The nacelle 12 circumscribes the gas turbine engine 10. The engine comprises of a fan section 14, a compressor section 16, a combustor section 18, and a turbine section 20. An axis $A_e$ is centrally disposed within the engine, extending longitudinally therethrough. A primary flow path 22 for working medium gases extends longitudinally along the axis $A_e$. A secondary flow path 24 for working medium gases extends parallel to and radially outward of the primary flow path 22.

The turbine section 20 includes an upstream high pressure turbine 26 and a downstream low pressure turbine 28. For example, the low pressure turbine 28 is formed by a stator assembly 30 and a rotor assembly 32. The rotor assembly 32 has a plurality of airfoils or blades 34 which extend radially outward from a rotor disk 36 across the primary working medium flow path 22. Each blade 34 is characterized by a stacking axis S which extends perpendicular to the engine axis $A_e$.

Figure 2:
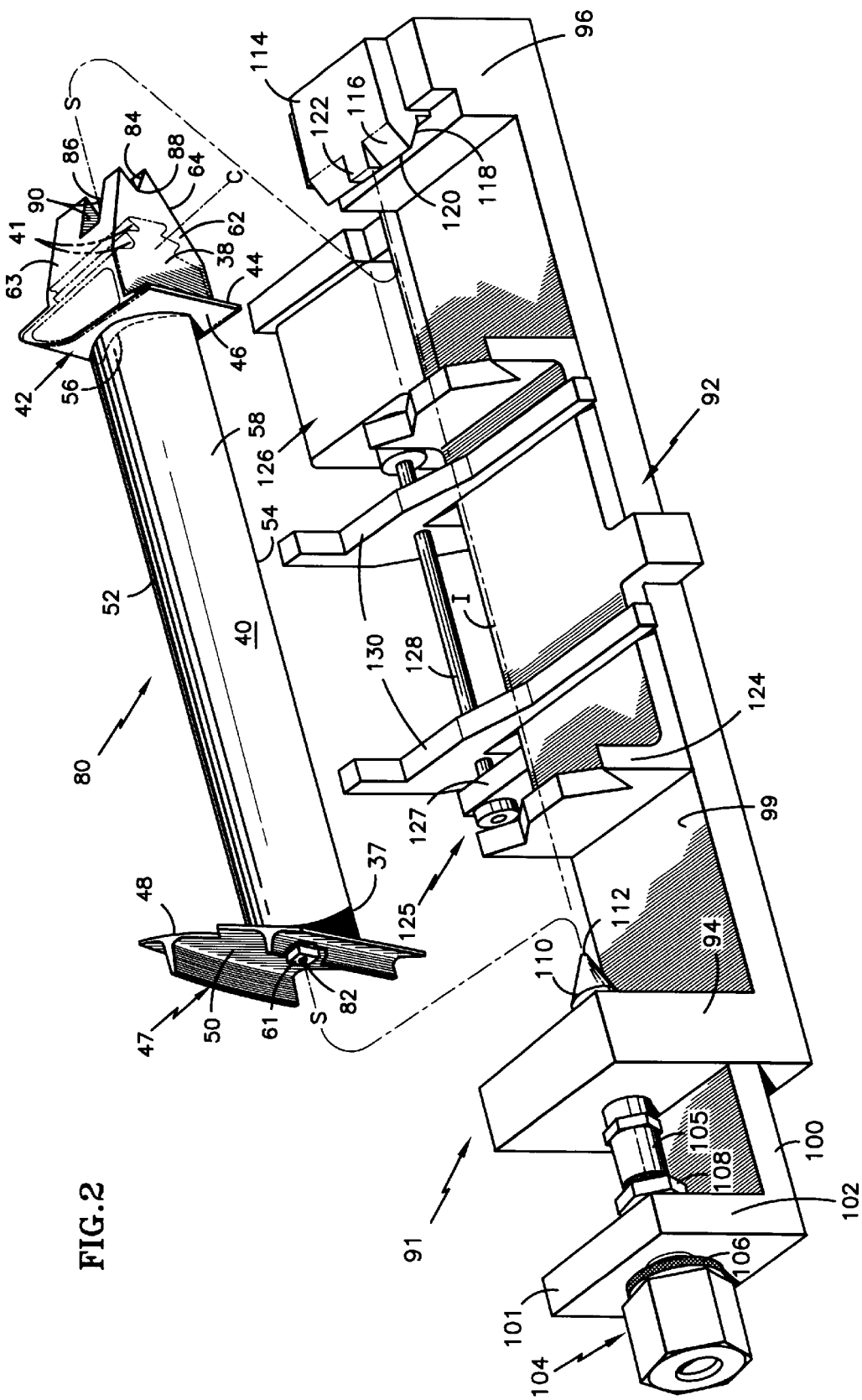
FIG. 2 is a perspective view of an embodiment of a fixture of the present invention for use with a blank.
Figure 5:
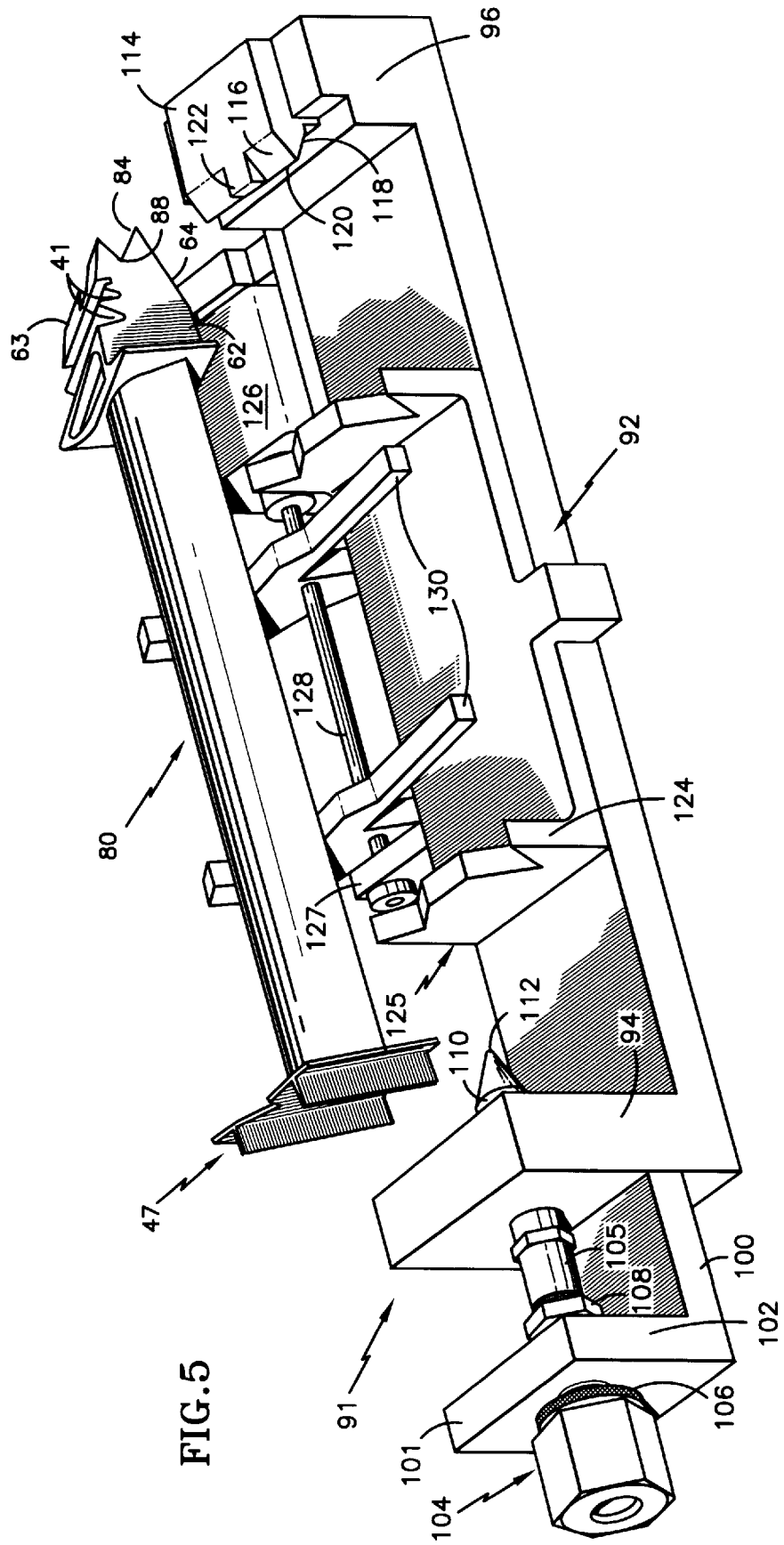
FIG. 5 is a perspective view of an embodiment of a fixture of the present invention for use with the blank being removed from the fixture with an ejector.

Referring to FIG. 2 the blank 80 generally has a tip 37, a root region 38 longitudinally spaced from the tip 37, and a midspan region 40 extending therebetween. A platform 42 separates the midspan region 40 from the root region 38. The platform 42 has an inner surface 44 adjacent the root region 38 and an opposed outer surface 46. The tip 37 further includes an integral shroud 47. The shroud 47 has an inner surface 48 adjacent the midspan region 40, and an opposed outer surface 50. The root region 38 includes a plurality of dove tails 41 which allow the blade to engage the rotor disk 36 (as shown in FIG. 1). The root region 38 further includes a root centerline C disposed centrally through the width of the root region 38. The midspan region includes a leading edge 52, a trailing edge 54 spaced from the leading edge, pressure surface 56, and a suction surface 58. The pressure and suction surfaces 56 and 58 extend between the leading and trailing edges 52 and 54.

The blank 80 from which the turbine blade 34 (as shown in FIG. 2) is formed further includes a protrusion 61, and a sacrificial region 62. The protrusion 61 extends from the radially outer surface 50 of the shroud 47 and is disposed on the stacking axis S. The sacrificial region 62 extends substantially longitudinally from the root region 38 (shown in phantom). The sacrificial region 62 includes a first surface 63, a second surface 64 spaced from the first surface 63, and a third surface (not shown) extending between the first and second surfaces 63 and 64, respectively.

The blank 80 is further characterized by first, second and third locators 82, 84, and 86, respectively. The first locator 82, in this embodiment a bore, is drilled into the protrusion 61 using rotary electron discharge machining. The first locator is disposed along the stacking axis S. The second and third locators 84 and 86, are machined into the starting blank 60 (as shown in FIG. 3) using wire electron discharge machining. The second locator 84, in this embodiment, is a notch. The second locator 84 extends from the first surface 63 to the second surface 64 of the sacrificial region 62. In this embodiment, the second locator 84 is a rectangular notch including vertical surfaces 90. The vertical surfaces 90 are equally spaced from the stacking axis S.

The third locator 86, is a notch, in this embodiment the notch 86, is cut from the third surface (not shown) of the sacrificial region 62. The third locator 86 preferably has a feature that is parallel to the root centerline C. In this embodiment, the third locator 86 is shaped like a triangular prism with a corner 88 that is parallel to the root centerline C.

A fixture 91 for holding the blank 80 during subsequent machining includes an integral U-shaped base 92 with first and second end walls 94 and 96 spaced apart to accommodate the blank 80 therebetween. The base 92 has an upper surface 99.

The fixture 91 further includes an L-shaped wall structure 100 extending from the outer surface of the first end wall 94. The L-shaped wall structure 100 includes a vertical wall 102. Both the base 92 and the L-shaped wall structure support a clamping mechanism 104.

The clamping mechanism 104 includes a movable shaft 105, which extends through the vertical wall 102 and the first end wall 94. The movable shaft 105 supports the other elements of the clamping mechanism 104. The clamping mechanism 104 further includes an adjustment knob 106, a locking nut 108, and a conical pin 110. The adjustment knob 106 attaches to one end of the shaft 105, so that the shaft 105 turns as the knob 106 is turned. The locking nut 108 is threaded onto the shaft 105 between the vertical wall 102 and the first end wall 94. The locking nut 108 prevents undesired shaft rotation, when it is threaded into engagement with the wall 102. The conical pin 110 attaches to the other end of the shaft 105. The conical pin 110 extends through the first end wall 94. The conical pin 110 has a tip 112.

The fixture further includes a wedge or abutment means 114 which attaches to the second end wall 96. The wedge 114 includes upper and lower surfaces 116 and 118, which join to form an edge 120. The angle between the upper and lower surfaces 116 and 118 of the wedge 114 allows the wedge to register with the third notch 86 of the blank 80. The upper surface 116 includes a rectangular projection 122 shaped to mate with the second notch 84 of the blank 80.

The tip 112 of the conical pin 110 and the edge 120 of the wedge 114 form an insertion axis I that is parallel to the upper surface 99 of the base 92. The projection 122 lies on the insertion axis I, so that the width of the projection 122 is equally divided on either side of the insertion axis I.

The base 92 may further include a platform 124 and an ejector 125. The platform 124 is disposed upon the upper surface 99 of the base of the fixture. The platform 124 is shaped so that upon placing the blank upon the platform, the stacking axis S and the insertion axis I are substantially aligned. The base further includes an ejector 125. The ejector 125 includes a rotating means 126, a support means 127, a shaft 128 extending between the rotating means 126 and the support means 127. The shaft is engaged with the rotating means and the support means, so that the rotating means rotates the shaft. The ejector further includes a two spaces arms 130 attached to the shaft 128.

The operation of the fixture will now be discussed. The fixture 91 attaches to the support surface within a grinding machine (not shown) using conventional methods. Referring to FIG. 3, with the fixture 91 in the open position the blank 80 is placed between the end walls 94 and 96 of the fixture 91, upon the platform 124. Thus positioned, the adjustment knob 104 is actuated so that the tip 112 of the conical pin moves along the insertion axis toward the second end wall 96. Referring to FIG. 4, the clamping mechanism is fully engaged with the blank when the tip 112 of the conical pin has fully engaged the first locator 82, the corner 88 of the third locator 86 mates with the edge 120 of the wedge 114, and the second locator 84 mates with the projection 122. Then, the locking mechanism 108 is engaged with the vertical wall 102 to ensure the location of the blank 80 does not change. The third locator 86 in combination with the wedge 114 prevents the blank from rotating during machining. The first locator 82 with the conical pin 110, and the second locator 84 with the projection 122 prevents the blank from moving widthwise. With the blade fixedly held in the fixture, the dove tails 41 can be ground into the first surface 63 of the sacrificial region 62 using conventional grinding machine operation techniques. Since the fixture references the stacking axis and the root centerline a programmable grinding machine can be used and is preferred. Referring to FIG. 4, once these dove tails are completed, the conical pin 110 is disengaged from the blank 80 and the ejector 126 is automatically activated. The rotating means 126 causes the shaft 128 to rotate and consequently, the arms 130 lift the blade out of the platform 124. Then, the blank is rotated and placed in a similar fixture, so that the second surface 64 is facing upward. Thus positioned, additional dove tails can be ground into the second surface 64 of the sacrificial region 62. Additional features can be ground into the blank, such as notches in the shroud or platform. Then the sacrificial region 62 is removed, thus removing the second and third locators 84 and 86. The protrusion 61 may then be machined off of the shroud 47.

The principal advantage of the present invention is that it allows the part to be machined with improved accuracy. This is due to having the references integral to the blade, locating the references within the blank on planes from which the critical dimensions are measured, and using the fixture which uses these locators directly. Thus, the part can be more accurately machined.

Another advantage of the present invention is that it allows a simple fixture to be used during machining of details to form a precisely shaped part. Since the references for machining the details are integral with the blank, and can be used to clamp the blade by the ends, the same fixture can be used with a variety of different length parts by modifying the distance between the end walls. Furthermore, the shape of the blade's midspan can change without requiring a different fixture; thus, eliminating the need for a different fixture for each part number. This eliminates the associated costs and delay of designing and building a fixture for each length part. The locators provide firm engagement with the fixture and therefore simple and economical fixture clamps are sufficient to position and hold the blank. This eliminates the need for fixtures with complex clamping mechanisms. It also eliminates downtimes during production associated with changing fixtures from one part length to another.

Yet another advantage is that manufacturing turbine blades no longer requires the use of encapsulation with low melt alloy, thus eliminating the time needed to encapsulate and the expensive to design and maintain encapsulation tools, fixturing tools, and melting machines. Furthermore it eliminates the need to dispose of the low melt alloy allows the clamping forces necessary to hold the blank in the fixture to be low.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. The base need not be integral and one of the end walls can be slidably mounted thereto in order to vary the distance between the end walls, so that different length blades may be accommodated. Furthermore, the platform and the ejector allow the process to utilize automated clamping with little operator interaction, however these features are optional. If a protrusion such as a conical one is used instead of the first locator being a bore, the conical pin of the fixture would have to be modified to include, for example, a conical bore to receive the conical protrusion. If placement of the locators may be changed, so that the same or another design reference axises or planes are used instead of the stacking axis or the root centerline, the fixture can be modified to complement the blank. It is therefore contemplated that the appended claims will cover any such modifications or embodiments that fall within the true scope of the invention.

We claim:

1. A fixture for holding a blank, the blank having a first locator and a second locator, the fixture including a base having end walls being spaced apart to accommodate the blank therebetween, the fixture being characterized by:

a clamping mechanism for mating with the first locator of the blank, the clamping mechanism being supported by one of the end walls; and an abutment having a prismatic shaped feature and being supported by the other end wall, such that upon securing the blank into the fixture, the clamping mechanism mates with the first locator and forces the second locator to mate with the prismatic shaped feature of the abutment to fixedly retain the blank within the fixture by the clamping mechanism and the abutment during subsequent machining operations.

2. The fixture of claim 1 wherein the clamping mechanism comprises a conical feature slidably engaged with the end wall of the base.

3. The fixture of claim 2 wherein the prismatic shaped feature comprises a wedge shaped projection.

4. The fixture according to claim 1 wherein the abutment has a prismatic shaped feature for mating with the second locator of the blank.

5. A fixture for holding a blank, the blank having a first locator and a second locator, the fixture including a base having end walls being spaced apart to accommodate the blank therebetween, the fixture being characterized by:

a clamping mechanism for holding the blank being supported by one of the end walls; and a wedge being supported by the other end wall, such that upon securing the blank into the fixture, the clamping mechanism mates with the first locator and forces the second locator to mate with the wedge for the blank to be fixedly secured within the fixture between the clamping mechanism and the wedge for subsequent machining operations.

6. The fixture of claim 5, wherein the clamping mechanism is characterized by having a conical pin slidably engaged with the end wall of the base.

7. The fixture of claim 5, wherein the base is characterized by having a platform disposed thereon.

8. The fixture of claim 7, wherein the base is characterized by having an ejector for lifting the blank from the platform.

9. A fixture for holding a blank, the blank having a first locator, a second locator, and a third locator, the fixture including a base having end walls being spaced apart to accommodate the blank therebetween, the fixture being characterized by:

a clamping mechanism for holding the blank being supported by one of the end walls; and an abutment means being supported by the other end wall, such that upon securing the blank into the fixture, the clamping mechanism mates with the first locator and forces the second locator and the third locator into contact with the abutment means to fixedly retain the blank within the fixture between the clamping mechanism and the abutment during subsequent machining operations.

10. The fixture of claim 9, wherein the clamping mechanism is characterized by having a conical pin slidably engaged with of the base.

11. The fixture of claim 9, wherein the base is characterized by having a platform disposed thereon.

12. The fixture of claim 11, wherein the base is characterized by having an ejector for lifting the blank from the platform.

13. A fixture for holding a blank, the blank having a first locator, a second locator, and a third locator, the fixture including a base having end walls being spaced apart to accommodate the blank therebetween, the fixture being characterized by:

a clamping mechanism for holding the blank being supported by one of the end walls; and an abutment having a wedge and being supported by the other end wall, such that upon securing the blank into the fixture, the clamping mechanism mates with the first locator and forces the second locator and the third locator into contact with the abutment, wherein the third locator contacts the wedge and maintains the blank fixedly secured within the fixture during subsequent machining operations.

14. The fixture of claim 13, wherein the clamping mechanism is characterized by having a conical pin slidably engaged with the end wall of the base.

15. The fixture of claim 13, wherein the base is characterized by having a platform disposed thereon.

16. The fixture of claim 15, wherein the base is characterized by having an ejector for lifting the blank from the platform.

17. A fixture for holding a blank, the blank having a first locator and a second locator, the fixture including a base having end walls being spaced apart to accommodate the blank therebetween, the fixture being characterized by:

a clamping mechanism for holding the blank being supported by one of the end walls;

an abutment having a prismatic shaped feature and being supported by the other end wall;

a platform disposed on the base; and an ejector for lifting the blank from the platform, such that upon securing the blank into the fixture, the clamping mechanism mates with the first locator and forces the second locator into contact with the abutment for subsequent machining operations.

18. A fixture for holding a blank, the blank having a first locator and a second locator, the fixture including a base having end walls being spaced apart to accommodate the blank therebetween, the fixture being characterized by:

a clamping mechanism for holding the blank being supported by one of the end walls;

an abutment being supported by the other end wall; and a platform supported by the base, such that upon placing the blank on the platform, the clamping mechanism is aligned with the first locator and the abutment is aligned with the second locator, and upon securing the blank in the fixture, the clamping mechanism mates with the first locator and forces the second locator into contact with the abutment such that the blank is fixedly retained within the fixture by the clamping mechanism and abutment during subsequent machining operations.

19. The fixture of claim 18 wherein the platform is stationary.

* * * * *

UNITED STATES PATENT AND TRADEMARK OFFICE
CERTIFICATE OF CORRECTION

PATENT NO. : 6,139,412
DATED : October 31, 2000
INVENTOR(S) : Dwyer

It is certified that error appears in the above-identified patent and that said Letters Patent is hereby corrected as shown below:

Claim 10, line 3, after "engaged with" insert --the end wall--.

Signed and Sealed this

Fifteenth Day of May, 2001

Attest:

NICHOLAS P. GODICI

*Attesting Officer*   *Acting Director of the United States Patent and Trademark Office*